Figure 1:
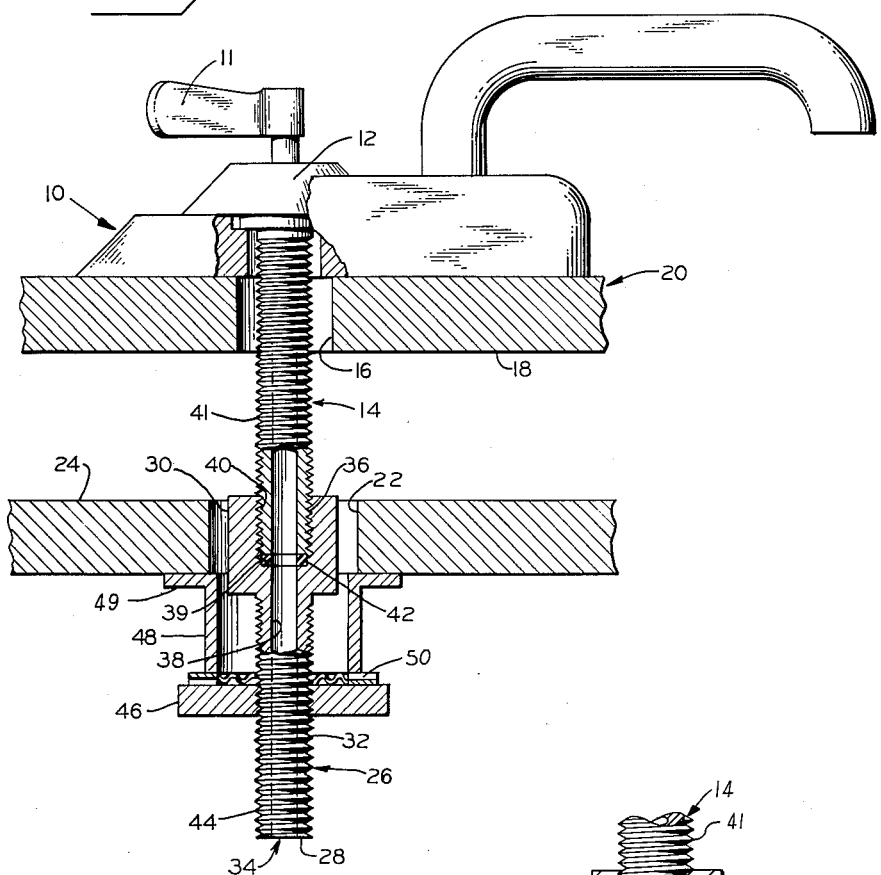

April 17, 1962

L. L. LEETE 3,029,831

VALVE CONNECTION

Filed July 30, 1959

INVENTOR.
LELAND L. LEETE

BY
*Christie, Parker & Hale*
ATTORNEYS 3,029,831
VALVE CONNECTION
Leland L. Leete, 10549 San Felipe Road,
Monte Vista, Calif.
Filed July 30, 1959, Ser. No. 830,528
2 Claims. (Cl. 137—360)

This invention relates to valve connections, and more particularly to extension couplings for facilitating installation of faucets.

Although the extension coupling of this invention can be used to advantage in a variety of situations to connect valves to a source of fluid, it is particularly suited for installating water faucets, and it is described in detail with reference to that application.

At the present time, most water faucets have a threaded connecting pipe which is adapted to be connected to a water line. The connecting pipe fits through an opening in a wall or cabinet top on which the faucet is to be mounted. A locking nut is made up on the connecting pipe to bear against the back side of the wall or cabinet and thus hold the faucet in place. In many installations, the structure of the wall or cabinet is such that the end of the connecting pipe terminates in a location which makes it difficult to apply the locking nut. For example, the connecting pipe may terminate in the wall on which it is being mounted, or in the plane of a wall spaced from the wall on which it is to be mounted, as in a bathroom cabinet. In such a case, some suitable time-consuming remedy must be taken to permit the installation of the faucet.

This invention provides a simple and inexpensive extension coupling which can be quickly attached to the connecting pipe to vary its effective length whenever necessary.

Briefly, the extension coupling of this invention includes a body having an opening extending through it. A first section of the body has a first set of annular threads around the opening and adapted to mate with the threads on the connecting pipe. A second section of the body has a second set of annular threads around the body opening which are substantially the same as the threads on the connecting pipe. Thus, when the connecting pipe on the faucet is an awkward length, the extension coupling is used to extend the effective length of the pipe and permit the locking nut to be applied to the second set of threads on the coupling.

In the preferred form of the invention, the coupling threads are straight, rather than tapered, to permit the locking nut to be set at any desired position along the second set of threads on the coupling. The threads on the faucet connecting pipe are usually straight male threads, so preferably the first set of threads on the coupling are straight female threads. An internal annular shoulder is provided in the body of the coupling to receive a washer against which the end of the faucet connecting pipe bears to make a watertight seal between the coupling and the pipe. The preferred form of the coupling also includes a tubular spacer adapted to fit coaxially around at least portions of the first and second sections of the coupling and bear against the back side of the wall when the first section of the coupling projects beyond the back side of the wall and prevents the locking washer from making direct engagement with the wall. The locking washer is then screwed onto the extension coupling until it bears against the spacer, which in turn engages the back side of the wall to hold the faucet firmly in place.

Figure 2:
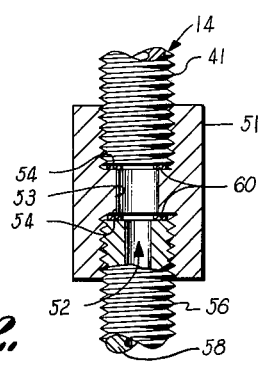

The invention will be more fully understood from the following detailed description taken in conjunction with the accompanying drawing, in which:

FIG. 1 is a fragmentary sectional elevation of a water faucet installed using the extension coupling of this invention; and FIG. 2 is a fragmentary sectional view of an alternate form of the extension coupler.

Referring to FIG. 1, a water faucet assembly 10, which may be of conventional type, includes a handle 11, a valve portion 12, and a downwardly extending connecting pipe 14 disposed in a vertical bore 16 in a top 18 of a cabinet 20.

For the purpose of illustrating the invention, the lower end of the connecting pipe is shown as terminating in a vertical bore 22 in the plane of a second wall 24 which forms the bottom of the cabinet. Thus, the location of the lower end of the connecting pipe is such that connection of the faucet to a source of water supply (not shown) is made awkward. This difficulty is readily overcome by using an extension coupling 26 which includes a body 28 having a relatively short first section 30 of one diameter at its upper end and a longer second section 32 of a smaller diameter at its lower end. An opening 34 extends through the coupling body, and includes a relatively large diameter bore 36 in the first section of the body, and a smaller bore 38 in the second section of the body, so that an annular internal shoulder 39 is formed in the opening 34 in the intermediate portion of the first section where the first and second bores meet.

The first bore includes internal female threads 40 adapted to mate with external male threads 41 on the connecting pipe of the faucet. An annular washer 42 is disposed on the annular shoulder in the coupling, which is screwed onto the lower end of the connecting pipe until the pipe bears firmly against the gasket to make a watertight seal between the connecting pipe and the coupling.

The second section of the coupling includes external male threads 44, which preferably are identical to the made threads on the connecting pipe so that a locking nut 46, which is conventionally supplied with the faucet assembly, can be threaded onto the second set of threads on the extension coupling.

When the first section of the extension coupling projects beyond the back side of the wall against which the locking nut is intended to bear, a tubular spacer 48 is disposed around a portion of the second section of the extension coupling, and the portion of the first section of the coupling projecting beyond the wall. Preferably, the extension coupling includes an outwardly extending flange 49 at its upper end which bears against the back side of the wall 24. The purpose of flange 49 is to accommodate openings of various sizes which may be made through the wall 24. A separate washer (not shown) may be substituted for the integral flange 49. A lock washer 50 is disposed between the lower end of the tubular spacer and the upper surface of the locking nut 46, so that when the locking nut is run up the extension coupling, the lock washer locks the nut in place after it has been brought to bear against the lower end of the spacer, which holds the faucet firmly in position.

The extension coupling is also useful in situations where the end of the faucet connecting pipe terminates in the wall on which the faucet is to be mounted. In such a case, the extension coupling is connected to the connecting pipe, and locking nut, or the tubular spacer if required, is disposed to bear directly against the back side of the wall on which the faucet is mounted. The locking nut and lock washer thus lock the assembly in place.

In the embodiment shown in FIG. 2, the extension coupler includes a cylindrical body 51 having a longitudinal bore 52 extending through it. The central portion of the bore is stepped down to a reduced diameter section 53 so that a pair of longitudinally spaced annular shoulders 54 are formed in the body. The ends of bore 52 each have straight internal threads to mate with the male threads 41 on the connecting pipe 14, and to mate with male threads 56 on an extension pipe 58. The ends of the connecting pipe and the extension pipe each bear on a respective annular gasket 60 on the shoulders in the body.

The extension coupler of FIG. 2 is used as the one shown in FIG. 1. The principal difference is that in the coupling of FIG. 2, the extension pipe is detachable from the coupling body instead of integral with it, permitting the overall length of the coupling to be readily made to suit a particular job by simply selecting an extension pipe of the correct length. When the extension pipe is selected from a set of pipe to fit a given job, its threads and those in the body of the coupling need not be straight, but may be tapered pipe threads, permitting the lower shoulder (as viewed in FIG. 2) in the body to be omitted.

From the foregoing it will be apparent that this invention provides a simple, yet highly effective, inexpensive coupling which can be readily used when needed to facilitate the installation of valves such as water faucets.

I claim:

1. A valve installation comprising first and second spaced walls having aligned holes opening through them, a valve disposed on a surface of the first wall and bearing against it, an externally threaded connecting pipe attached to the valve and extending into the hole in the first wall, the outside diameter of the connecting pipe being smaller than the hole in the first wall so the connecting pipe makes a slip fit into the hole, a coupling including a body having an opening extending through it, a first section of the body having a first set of annular internal threads around the opening and connected with the external threads on the connecting pipe, the outside diameter of the first section being smaller than the hole in the second wall so the coupling makes a slip fit into it, a second section of the body having a set of external threads substantially the same as those on the connecting pipe, a spacer having an opening through it large enough to fit around the first section on the coupling, the outside dimension of the spacer being greater than the hole in the second wall and the spacer being disposed around at least a portion of the first and second sections of the coupling to bear against the outer surface of the second wall, and a lock nut on the external threads of the second section of the coupling urging the spacer against the second wall.

2. Apparatus according to claim 1 in which spacer includes an outwardly extending flange at one end adjacent the second wall.

References Cited in the file of this patent

UNITED STATES PATENTS

| | | |
|---|---|---|
| 497,990 | Simrell | May 23, 1893 |
| 1,305,009 | Robertson | May 27, 1919 |
| 1,339,418 | Poehland | May 11, 1920 |
| 1,718,662 | Oakley | June 25, 1929 |
| 2,575,685 | Shugart | Nov. 20, 1951 |